(12) United States Patent
Kato et al.

(10) Patent No.: US 8,491,847 B2
(45) Date of Patent: Jul. 23, 2013

(54) APPARATUS OF CATALYST FOR PURIFYING EXHAUST GAS AND METHOD FOR PURIFYING EXHAUST GAS

(75) Inventors: Katsuaki Kato, Shizuoka (JP); Yoshiro Hirasawa, Shizuoka (JP); Takashi Yamada, Shizuoka (JP)

(73) Assignee: N.E. Chemcat Corporation, Tokyo (JP)

( * ) Notice: Subject to any disclaimer, the term of this patent is extended or adjusted under 35 U.S.C. 154(b) by 456 days.

(21) Appl. No.: 12/989,757

(22) PCT Filed: Apr. 23, 2009

(86) PCT No.: PCT/JP2009/058050
§ 371 (c)(1),
(2), (4) Date: Oct. 26, 2010

(87) PCT Pub. No.: WO2010/010747
PCT Pub. Date: Jan. 28, 2010

(65) Prior Publication Data
US 2011/0041486 A1    Feb. 24, 2011

(30) Foreign Application Priority Data
Jul. 25, 2008   (JP) ................. 2008-192389

(51) Int. Cl.
*B01D 50/00* (2006.01)
(52) U.S. Cl.
USPC .......................................... 422/177; 422/180
(58) Field of Classification Search
USPC ................. 422/177, 180, 211, 212; 60/274, 60/299, 300; 502/100; 423/210
See application file for complete search history.

(56) References Cited

U.S. PATENT DOCUMENTS

| 6,087,298 A | 7/2000 | Sung et al. |
| 7,785,545 B2 | 8/2010 | Miyoshi et al. |

(Continued)

FOREIGN PATENT DOCUMENTS

| EP | 1900416 A2 | 3/2008 |
| EP | 1900427 A1 | 3/2008 |

(Continued)

OTHER PUBLICATIONS

International Search Report of PCT/JP2009/058050, mailing date Jul. 21, 2009.

(Continued)

*Primary Examiner* — Tom Duong
(74) *Attorney, Agent, or Firm* — Westerman, Hattori, Daniels & Adrian, LLP

(57) ABSTRACT

An apparatus for purifying exhaust gas exhausted from an internal combustion engine, using two or more honeycomb structure-type catalysts (X) and (Y). The catalyst (X) contains the support material of the zirconium oxide as a main component which loads a Rh component on the support material of zirconium oxide and substantially does not contain a cerium component, and a cerium-containing oxide which substantially does not load the Rh component, and the catalyst (X) does not substantially contain Pt component and Pd component. The catalyst (Y) contains the support material of the cerium-zirconium composite oxide as a main component which loads a Rh component on the support material of cerium-zirconium composite oxide and which contains cerium of 1 to 20% by weight, in an oxide equivalent, and zirconium of 99 to 80% by weight, in an oxide equivalent, and the catalyst (Y) does not substantially contain Pt component and Pd component.

10 Claims, 7 Drawing Sheets

Schematic configuration drawing

Upstream side catalyst

Downstream side catalyst

U.S. PATENT DOCUMENTS

| | | | |
|---|---|---|---|
| 8,202,819 B2* | 6/2012 | Kohara et al. | 502/304 |
| 8,337,791 B2* | 12/2012 | Kohara et al. | 423/213.2 |
| 2008/0056965 A1 | 3/2008 | Miyoshi et al. | |
| 2008/0066458 A1 | 3/2008 | Toyoda et al. | |
| 2009/0269265 A1* | 10/2009 | Ando et al. | 423/239.2 |
| 2010/0061903 A1* | 3/2010 | Kohara et al. | 423/213.2 |
| 2011/0113754 A1* | 5/2011 | Kohara et al. | 60/274 |
| 2011/0274603 A1* | 11/2011 | Kohara et al. | 423/213.5 |

FOREIGN PATENT DOCUMENTS

| | | |
|---|---|---|
| EP | 1911517 A1 | 4/2008 |
| JP | 3-106446 A | 5/1991 |
| JP | 5-237390 A | 9/1993 |
| JP | 6-75675 B2 | 9/1994 |
| JP | 2002-326033 A | 11/2002 |
| JP | 2005-279437 A | 10/2005 |
| JP | 2006-346525 A | 12/2006 |
| JP | 2007-038072 A | 2/2007 |
| JP | 2007-319768 A | 12/2007 |
| JP | 2008-062156 A | 3/2008 |
| JP | 2008-068225 A | 3/2008 |
| JP | 2008-114227 A | 5/2008 |
| WO | 97/43035 A1 | 11/1997 |
| WO | 00/27508 A1 | 5/2000 |

OTHER PUBLICATIONS

Supplementary European Search Report dated Jul. 6, 2011, issued in corresponding European Patent Application No. 09800263.7.

* cited by examiner

Schematic configuration drawing

Flow of exhaust gas →

Upstream side catalyst

Downstream side catalyst a) lean b) stoichiometric c) rich

[Example 1]

Upstream side catalyst (X)    Downstream side catalyst (Y)

[Comparative Example 1]

Upstream side catalyst (X)    Downstream side catalyst (Y)

[Comparative Example 2]

Upstream side catalyst (X)    Downstream side catalyst (Y)

[Comparative Example 3]

Upstream side catalyst (X)    Downstream side catalyst (Y)

[Comparative Example 4]

Upstream side catalyst (X)    Downstream side catalyst (Y)

[Comparative Example 5]

Upstream side catalyst (X)    Downstream side catalyst (Y)

APPARATUS OF CATALYST FOR PURIFYING EXHAUST GAS AND METHOD FOR PURIFYING EXHAUST GAS

BACKGROUND OF THE INVENTION

1. Field of the Invention

The present invention relates to an apparatus of a catalyst for purifying exhaust gas exhausted from an automobile and a method for purifying exhaust gas using this catalyst apparatus, and in particular, relates to an apparatus of a catalyst for purifying exhaust gas suitable as a three-way catalyst (TWC) apparatus to be used for purifying carbon monoxide (CO), a hydrocarbon (HC) and a nitrogen oxide ($NO_x$) in exhaust gas exhausted from a gasoline automobile and a method for purifying exhaust gas.

2. Description of the Prior Art

Various catalysts have been used in response to objective thereof, in an apparatus of a catalyst for purifying exhaust gas exhausted from an internal combustion engine of an automobile or the like. As major catalyst components thereof, there are platinum group metals, which are usually used with being loaded, in a highly dispersed state, on a refractory inorganic oxide with high surface area, such as activated alumina (refer to Patent Document 1).

As for the platinum group metals as a catalyst component, platinum (Pt), palladium (Pd) and rhodium (Rh) are known, which have been used widely as the catalyst for purifying exhaust gas exhausted from an internal combustion engine of an automobile or the like. In the above TWC, catalytically active species superior in oxidation activity, such as Pt and Pd, and Rh superior in purification activity of $NO_x$ are used in combination in many cases. In recent years, strictness of regulations for harmful substances, in particular, $NO_x$ contained in exhaust gas has been increasing. Therefore, it is necessary to use efficiently Rh superior in purification activity of $NO_x$. In addition, output of Rh is low, Rh is expensive and market price thereof has been rising in recent years. Therefore, it is preferable to reduce use amount of Rh as catalytically active species, in view of resource protection or a cost aspect.

In addition, in the catalyst for purifying exhaust gas, the addition of various co-catalyst components other than the platinum group metals in the catalyst for purifying exhaust gas have been studied, to attain enhancement of still more purification performance. As such co-catalyst components, there has been known an oxygen storage component (OSC), an alkaline earth metal, zirconium oxide, zeolite or the like.

Among them, the OSC is one for storing and discharging oxygen in exhaust gas, and cerium oxide has been known. Cerium oxide stores oxygen as $CeO_2$, when oxygen concentration in exhaust gas is high, and discharges oxygen by being converted to $Ce_2O_3$, when oxygen concentration is low. Oxygen discharged is active oxygen and promotes purification of HC or CO by being utilized in oxidation action by Pt or Pd. In addition, by storage and discharge of oxygen, the OSC also acts to buffer the oxygen concentration change in exhaust gas. By this action, in the TWC, purification performance of exhaust gas enhances. The TWC performs oxidation and reduction by one catalyst, and has a range of exhaust gas components suitable for purification in view of designing. This range depends on air/fuel ratio in many cases. Such a range is referred to as a window, and in many cases, exhaust gas combusted at the vicinity of theoretical air/fuel ratio is set as the window region. By buffering variation of oxygen concentration in exhaust gas, this window region can be maintained for a long period, and purification of exhaust gas is performed efficiently. It has been said that this has influence, in particular, on purification performance of $NO_x$ by RH.

As such cerium oxide, pure cerium oxide may also be used, however, it is used as a composite oxide with zirconium (refer to Patent Document 2). The cerium-zirconium composite oxide has high heat resistance, and is said to have high storing and discharging rate of oxygen. Reason for this is considered that a crystal structure of the cerium-zirconium composite oxide is stable, by which an action of a cerium oxide, which is a major OSC component, is not obstructed, and can be utilized in an action as the OSC up to the inside of particles.

In such purification of $NO_x$ by Rh, it is considered for a steam reforming reaction to be promoted as follows via the Rh component.

$$HC + H_2O \ldots \rightarrow COx + H_2 \quad (1)$$

$$H_2 + NOx \ldots \rightarrow N_2 + H_2O \quad (2)$$

And, zirconium oxide is said to promote the steam reforming reaction by using together with the Rh component (refer to Patent Document 3).

As a co-catalyst component, other than this, the alkaline earth metal such as a Ba component has been known (refer to Patent Document 4). The Ba component temporarily stores $NO_x$ contained in exhaust gas, and purifies $NO_x$ stored by reducing to $N_2$ by a reducing component contained in exhaust gas.

In general, $NO_x$ generates in a large quantity, when fuel supplied to an engine is less and amount of air is much. The Ba component temporary absorbs $NO_x$ generating in this way.

$NO_x$ absorbed by the Ba component is discharged from the Ba component when concentration of $NO_x$ in exhaust gas is low, and CO concentration becomes high. In continuation of the above example, this is derived from a reaction of the Ba $(NO_3)_2$ with CO to become $BaCO_3$ and may be said chemical equilibrium. $NO_x$ discharged from the Ba component, as described above, reacts with reducing components at the surface of the Rh component to be reductively purified.

Such a co-catalyst component may be used in combination of two or more kinds, for example, the TWC using the Ba component and cerium oxide has been known (refer to Patent Document 5). However, purification performance may be decreased depending on a combination of catalyst materials, for example, presence of the Rh component and the Ba component in the same composition is reported to decrease purification performance of $NO_x$ (refer to Patent Document 6). Reason for this is not certain, however, because the alkaline earth metal component has an action of storing $NO_x$, it is considered that purification performance of $NO_x$ in the Rh component is obstructed, or the Ba component and the Rh component may produce an alloy.

In this way, there are various combinations of catalyst components, and because of passing a complicated reaction route by mutual interaction of the catalyst components, combinations of the catalyst components exerting purification performance most have been searched by comprehensive study thereof.

It should be noted that, the catalyst for purifying exhaust gas may be enough to be arranged at one place in a flow passage of exhaust gas, however, there may be the case where two or more are arranged. Because in this way, surface area of the catalyst is increased, purification performance of exhaust gas is enhanced. However, as described above, because the catalyst for purifying exhaust gas such as the TWC has a window region in view of designing, simple arrangement of a plurality of catalysts may not provide desired catalyst for purifying exhaust gas in some cases. It is because components of exhaust gas passed through the catalyst at the front stage are different from those of exhaust gas just after being exhausted from an engine, it is necessary to design composition of exhaust gas thus changed as the window region.

The present applicant has also proposed a catalyst system, where two catalysts having a platinum group metal and an oxygen storage component (OSC) as the catalyst components are arranged in a exhaust gas flow passage (refer to Patent Document 7). In this way, purification performance of exhaust gas not attained conventionally was able to attain.

However, in recent years, regulations for exhaust gas have been increasingly strict, and appearance of a catalyst apparatus is desired which exerts more superior exhaust gas purification performance using a plurality of catalysts. Regulation values for, in particular, $NO_x$, among exhaust gas, have become strict, and also for the TWC, there has been increasing necessity of an apparatus of catalyst for purifying exhaust gas superior in purification performance of $NO_x$.

PRIOR DOCUMENTS
PATENT DOCUMENTS

| | |
|---|---|
| Patent Document 1: | JP-A-5-237390 |
| Patent Document 2: | JP-B-6-75675 |
| Patent Document 3: | JP-A1-2000/027508, page 14 |
| Patent Document 4: | JP-A-2007-319768, paragraph 0003 |
| Patent Document 5: | JP-A-03-106446 |
| Patent Document 6: | JP-A-2002-326033, paragraph 0013 |
| Patent Document 7: | JP-A-2008-68225 |

SUMMARY OF THE INVENTION

In view of the above conventional problems, it is an object of the present invention to provide an apparatus of a catalyst for purifying exhaust gas and a method for purifying exhaust gas for purification by contacting, harmful substances contained in exhaust gas exhausted from an internal combustion engine of an automobile or the like, with the catalyst, and in particular, to provide an apparatus of a catalyst for purifying exhaust gas and a method for purifying exhaust gas superior in purification performance of $NO_x$ as an apparatus of catalyst for purifying exhaust gas using the TWC catalyst.

The present inventors have intensively studied a way to solve the above-described conventional problems and found that a hydrocarbon (HC), carbon monoxide (CO) and a nitrogen oxide ($NO_x$) can be purified efficiently by configuring an apparatus of a catalyst for purifying exhaust gas for purifying a hydrocarbon (HC), carbon monoxide (CO) and a nitrogen oxide ($NO_x$), by providing two or more honeycomb structure-type catalysts, wherein the surface of a honeycomb-type structure is coated with two or more layers of catalyst compositions, in a flow passage of exhaust gas exhausted from an internal combustion engine, and making exhaust gas pass; and by setting so that the honeycomb structure-type catalyst positioned at the upstream side and the honeycomb structure-type catalyst positioned at the downstream side, contain a support material of an inorganic oxide which substantially does not contain an Rh component, and loads at least one of a Pt component and a Pd component, a cerium-containing oxide, and an alkaline earth metal component, in all of the lower layers; on the other hand, by setting so that the catalyst composition of the upper layer loads the Rh component on each specific support material of zirconium oxide; and the Pt component and the Pd component are not substantially contained; and have thus completed the present invention.

That is, according to a first aspect of the present invention, there is provided an apparatus of a catalyst for purifying exhaust gas for purifying a hydrocarbon (HC), carbon monoxide (CO) and a nitrogen oxide ($NO_x$), by providing two or more honeycomb structure-type catalysts, wherein the surface of a honeycomb-type structure is coated with two or more layers of catalyst compositions, in a flow passage of exhaust gas exhausted from an internal combustion engine, and making exhaust gas pass, characterized in that:

the honeycomb structure-type catalyst (X) positioned at the upstream side and the honeycomb structure-type catalyst (Y) positioned at the downstream side contain the catalyst composition composed of a support material of an inorganic oxide which substantially does not contain an Rh component, and loaded at least one of a Pt component or a Pd component, a cerium-containing oxide, and an alkaline earth metal component, in all of the lower layers; on the other hand, the catalyst composition of the upper layer has the following configuration:

<The Honeycomb Structure-Type Catalyst (X)>

The catalyst (X) contains the support material of the zirconium oxide as a main component which load a Rh component on the support material of zirconium oxide and substantially does not contain a cerium component, and a cerium-containing oxide which substantially does not load the Rh component, and the catalyst (X) does not substantially contain Pt component and Pd component.

<The Honeycomb Structure-Type Catalyst (Y)>

The catalyst (Y) contains the support material of the cerium-zirconium composite oxide as a main component which load a Rh component on the support material of cerium-zirconium composite oxide and which contains cerium of 1 to 20% by weight, in an oxide equivalent, and zirconium of 99 to 80% by weight, in an oxide equivalent, and the catalyst (Y) does not substantially contain Pt component and Pd component.

In addition, according to a second aspect of the present invention, there is provided, in the first aspect, the apparatus of a catalyst for purifying exhaust gas, characterized in that the support material of the inorganic oxide contained in the lower layer of the honeycomb structure-type catalyst (X) and the honeycomb structure-type catalyst (Y) is alumina.

In addition, according to a third aspect of the present invention, there is provided, in the first aspect, the apparatus of a catalyst for purifying exhaust gas, characterized in that the alkaline earth metal component contained in the lower layer of the honeycomb structure-type catalyst (X) and the honeycomb structure-type catalyst (Y) is a barium component.

In addition, according to a fourth aspect of the present invention, there is provided, in the first aspect, the apparatus of a catalyst for purifying exhaust gas, characterized in that the cerium-containing oxide contained in the lower layer of the honeycomb structure-type catalyst (X) and the honeycomb structure-type catalyst (Y) is the cerium-zirconium composite oxide.

In addition, according to a fifth aspect of the present invention, there is provided, in the first aspect, the apparatus of a catalyst for purifying exhaust gas, characterized in that amounts of the lower layer catalyst components of the honeycomb structure-type catalyst (X) and the honeycomb structure-type catalyst (Y) are as follows, per unit volume:

the Pt component and/or the Pd component are 0.01 to 10 g/L the inorganic oxide loading the Pt component and the Pd component is 1 to 300 g/L the cerium-containing oxide is 3 to 200 g/L the alkaline earth metal component is 1 to 30 g/L.

In addition, according to a sixth aspect of the present invention, there is provided, in the first aspect, the apparatus of a catalyst for purifying exhaust gas, characterized in that amounts of the upper layer catalyst components of the honeycomb structure-type catalyst (X) are as follows, per unit volume:

the Rh component is 0.01 to 2 g/L the zirconium oxide loading the Rh component is 1 to 300 g/L the cerium-containing oxide not loading the Rh component is 3 to 200 g/L.

Further, according to a seventh aspect of the present invention, there is provided, in the first aspect, the apparatus of a catalyst for purifying exhaust gas, characterized in that amounts of the upper layer catalyst components of the honeycomb structure-type catalyst (Y) are as follows, per unit volume:

the Rh component is 0.01 to 2 g/L the cerium-zirconium composite oxide loading the Rh component is 1 to 300 g/L.

In addition, according to an eighth aspect of the present invention, there is provided, in the first aspect, the apparatus of a catalyst for purifying exhaust gas, characterized in that the honeycomb-type structure is a flow-through-type honeycomb-type structure having a cell density of 10 to 1500 cell/inch$^2$.

On the other hand, according to a ninth aspect of the present invention, there is provided, in any of the first to the eighth aspects, a purification method for exhaust gas, characterized in that a hydrocarbon (HC), carbon monoxide (CO) and a nitrogen oxide ($NO_x$) are purified by supplying exhaust gas from an internal combustion engine to the apparatus of a catalyst for purifying exhaust gas, and by making it sequentially contacted with the honeycomb structure-type catalyst (X) at the upstream side of the exhaust gas flow passage and the honeycomb structure-type catalyst (Y) at the downstream side of the exhaust gas flow passage.

In addition, according to a tenth aspect of the present invention, there is provided, in the ninth aspect, the purification method for exhaust gas, characterized in that the internal combustion engine is a gasoline engine, and gasoline fuel is combusted under control to lean-rich states from theoretical air/fuel ratio.

According to the present invention, by using two or more honeycomb structure-type catalysts having each different catalyst composition; arranging them at the upstream side and the downstream side in a exhaust gas flow passage; setting that the lower layer of the honeycomb structure-type catalyst contains a support material of an inorganic oxide which substantially does not contain an Rh component, and loads at least one of a Pt component and a Pd component, a cerium-containing oxide, and an alkaline earth metal component; on the other hand, in the upper layer, by setting that kind of a support material of an inorganic oxide loading the Rh component is changed for the upstream side catalyst and the downstream side catalyst, and substantially the Pt component and the Pd component are not contained; an apparatus of a catalyst for purifying exhaust gas can be provided, which exerts superior capability in purification of $NO_x$ in exhaust gas, generating in a large amount when an engine using fossil fuel is operated, in particular, in a lean-burn state.

In particular, when the catalyst apparatus of the present invention is used as the TWC, HC or CO can be purified following variation of concentration or temperature of exhaust gas at the position where the honeycomb structure-type catalyst is provided, as well as high purification performance of $NO_x$ can be obtained.

DETAILED DESCRIPTION OF THE INVENTION

Explanation will be given below in detail on an apparatus of a catalyst for purifying exhaust gas and a method for purifying exhaust gas by the present invention, mainly on the TWC for purifying exhaust gas from an automobile, with reference to FIGS. 1 to 3. However, the present invention should not be limited to a catalyst field for purifying automotive exhaust gas such TWC application, and is applicable widely for purification of exhaust gas exhausted from an engine using fossil fuel, within a range of the gist of the present invention.

1. The Apparatus of the Catalyst for Purifying Exhaust Gas

Figure 1:
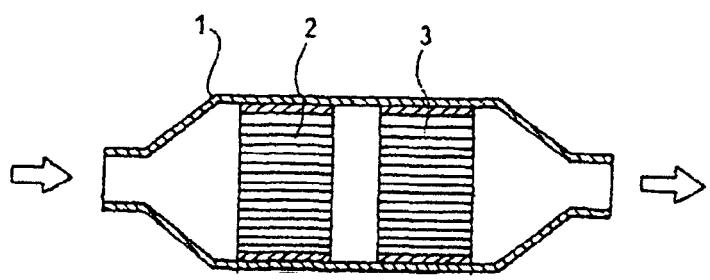
FIG. 1 is an explanation drawing showing cross-section of an apparatus of a catalyst for purifying exhaust gas of the present invention.
Figure 2:
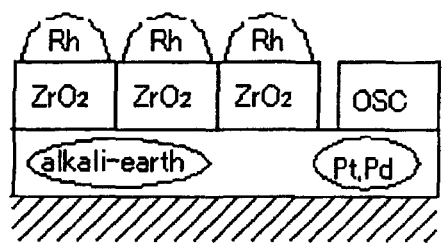
FIG. 2 is a schematic drawing representing basic catalyst composition of a honeycomb structure-type catalyst relevant to the present invention.
Figure 2:
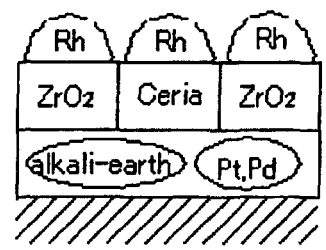

The apparatus of the catalyst for purifying exhaust gas of the present invention is one, as shown in FIG. 1, for arranging each one or more honeycomb structure-type catalysts, having at least specific layer configuration, at the upstream side (2) and the downstream side (3) of a catalyst container (1) provided in a flow passage of exhaust gas exhausted from an internal combustion engine, and is one for purifying harmful components, by making exhaust gas pass through this.

In the apparatus of the catalyst for purifying exhaust gas of the present invention, two or more honeycomb structure-type catalysts are used. In the honeycomb structure-type catalyst, the surface of a honeycomb-type structure is coated with two or more layers of catalyst compositions with different composition. It is because of avoiding offset of each catalytic activity by a composition for promoting oxidation of HC or CO, and a composition for promoting reduction of $NO_x$, and not using, in the same layer, materials which result in decreasing activity caused by sintering or the like when positioned adjacently, so as to still more enhance purification efficiency of exhaust gas by utilizing also synergy effect of each layer.

When the catalyst composition is arranged in multiple layers, in the catalyst layer at the upper side which tends to contact with exhaust gas components, purification of the exhaust gas components tends to be promoted more as compared with the catalyst layer at the lower side. Therefore, catalytically active species of the upper layer may exert high purification activity even in small amount. In the present invention, such a catalyst layer arranged in the upper layer is referred to as the upper layer catalyst layer (or, simply, the upper layer), and a catalyst layer arranged at the lower side of the upper layer is referred to as the lower layer catalyst layer (or, simply, the lower layer).

Explanation will be given here briefly on a configuration of the apparatus of the catalyst for purifying exhaust gas of the present invention, with reference to FIG. 2. Toward flow of exhaust gas, both of the honeycomb structure-type catalyst (X), which is the upstream side catalyst, and the honeycomb structure-type catalyst (Y), which is the downstream side catalyst, have the same catalyst composition in the lower layer, and at least either of the Pt component or the Pd component, the cerium-containing oxide (not shown), and the alkaline earth metal component (indicated as "alkali-earth" in the drawing) are contained.

In addition, in the upper layer of the upstream catalyst, $ZrO_2$ loading the Rh component, and a cerium-containing oxide not loading the Rh component are contained. The cerium-containing oxide in the upper layer of this upstream catalyst is indicated as the OSC in the drawing. In the upper layer of the downstream catalyst, the Rh component loaded on $CeO_2.ZrO_2$ is contained. The cerium component in $CeO_2.ZrO_2$ is indicated as "Ceria" in the drawing. The cerium component in $CeO_2.ZrO_2$ changes to $CeO_2$ and $Ce_2O_3$ by oxidation and reduction accompanying with storage and discharge of oxygen.

2. The Lower Layer of the Honeycomb Structure-Type Catalyst

In this way, at the lower layer, which is a carrier side of the honeycomb structure-type catalyst to be used in the present invention, at least one of the Pt component and the Pd component loaded on a heat resistant inorganic oxide is contained.

<The Pt Component and the Pd Component>

The Pt component and the Pd component are catalytically active species exerting oxidation activity. Among these, the Pd component is cheaper than the Rh component and the Pt component, and even by using in a relatively large amount, a catalyst can be designed at a price easily acceptable on the market. Therefore, it is preferable that the Pd component is used in the lower layer, as all of or a major component of a noble metal component.

However, the Pd component tends to decrease catalytic activity caused by poisoning by a sulfur component. Therefore it is desirable that a large amount of the Pd component is used, or it is used in exhaust gas exhausted by using fuel containing low amount of the sulfur component. As such fuel containing low amount of the sulfur component, there is also light oil modified to low sulfur, however, gasoline is most prevailed. Therefore, it is preferable that a catalyst using the Pd component as all of or a major component of the noble metal component is the TWC to be used for purification of exhaust gas exhausted from a gasoline engine.

In addition, the lower layer of the honeycomb structure-type catalyst used in the present invention substantially does not contain the Rh component. As described above, when a catalytically active specie exerting oxidation activity such as the Pt component and the Pd component, and the Rh component exerting reduction activity are present in the same layer, each activity may be offset in some cases.

In addition, Pd is also a metal having fear of alloying or sintering with Rh, and both metals sintered may decrease activity in some cases (JP-A-2002-326033, paragraph 0004). Therefore, it is desirable to avoid presence of the Pd component and the Rh component in the same catalyst layer.

Basic composition in this lower layer is similar both in the honeycomb structure-type catalyst (X) at the upstream side, and the honeycomb structure-type catalyst (Y) at the downstream side.

The honeycomb structure-type catalyst to be used in the present invention is made in multiply layers, and in the lower layer, at least either of the Pt component and the Pd component loaded on the support material of the inorganic oxide, the cerium-containing oxide which substantially does not load the Pt component and the Pd component, and the alkaline earth metal component are contained. By adopting such a layer-like configuration, as well as reductive purification action of $NO_x$, purification capability of CO or HC in exhaust gas also enhances.

In the lower layer of the honeycomb structure-type catalyst in the present invention, at least either of the Pt component or the Pd component is contained in each catalyst composition in an amount of 0.01 to 10 g/L, desirably 0.05 to 9 g/L. The too much amount increases concentrations of the Pt component and the Pd component, by which sintering may proceed excessively in some times in exposure to high temperature in use. When sintering proceeds, surface area of the Pt component and the Pd component decreases and activity decreases. In addition, the too less amount does not provide sufficient activity necessary, due to absolute lack of number of an active site.

The Pt component and the Pd component both have oxidation activity of CO or HC, however, the pt component is expensive although having high oxidation activity, while the Pd component is cheaper as compared with the Pt component. Therefore, use of the Pd component enables to reduce use amount of the Pt component.

<The Support Material of the Inorganic Oxide>

The support material loading the Pt component and the Pd component is not especially limited, as long as it is porous, has heat resistance and is capable of maintaining high specific surface area value even in exhaust gas, and it may be selected from alumina, zirconia, titania, silica, silica-alumina, zeolite or the like, which are used in a catalyst for automotive exhaust gas. Such a support material having high heat resistance and high specific surface area is capable of maintaining a highly dispersed state of the Pt component and the Pd component, and exerting superior purification performance, even in high temperature exhaust gas. As such a heat resistant inorganic oxide, alumina is preferable and among them γ-alumina is preferable.

γ-alumina has high heat resistance and high specific surface area, and is superior in dispersing property of the Pt component and the Pd component. And, in the case of γ-alumina, it is preferable that lanthanum is added still more. γ-alumina added with lanthanum is superior in heat resistance, and has been known that when a noble metal component is loaded, it maintains high catalytic activity even at high temperature (JP-A-2004-290827). Specific surface area value (measured by a BET method; the same hereafter) of such γ-alumina or γ-alumina added with lanthanum is preferably 80 to 250 m$^2$/g, and still more 200 to 250 m$^2$/g is more preferable. When the specific surface area of γ-alumina is equal to or lower than 250 m$^2$/g, a catalyst with high heat resistance can be obtained. In addition, the specific surface area of equal to or higher than 80 m$^2$/g can stabilize a noble metal component in a highly dispersed state.

Alumina is contained in each catalyst composition, in an amount of 1 to 300 g/L, and more desirably 15 to 200 g/L. The too much amount increases thickness of the catalyst layer excessively and makes difficult to raise catalyst temperature up to temperature suitable for purification. In addition, thus thickened catalyst layer obstructs gas diffusion to a deep part of the catalyst layer, resulting in not providing sufficient activity. On the contrary, the too less amount increases concentration of the Pt component or the Pd component in the catalyst composition, resulting in proceeding of sintering of the Pt component or the Pd component, in exposure to high temperature in use, and not providing activity comparable to the use amount.

It should be noted that, this alumina is used as a support material loading the above Pt component and the Pd component, however, it can be used not only as such a support material loading the Pt component and the Pd component, but also as a binder, by adding to the catalyst composition.

<The Alkaline Earth Metal Component>

In the catalyst for purifying exhaust gas to be used in the present invention, the alkaline earth metal component is contained in both of the upstream catalyst and the downstream catalyst, in the lower layer thereof.

The alkaline earth metal component is made contained in the lower layer, because presence thereof in the same layer with the Rh component in the upper layer decreases purification performance of NO$_x$ (JP-A-2002-326033, [0013]). The reason for this effect is not certain, however, it is considered to be brought about by the facts that the alkaline earth metal component has an action of storing NO$_x$, thus obstructing a purification action of NO$_x$ in the Rh component, and the Ba component and the Rh component produce an alloy. In the present invention, the Rh component should be used in the upper layer aiming at promoting purification performance of NO$_x$, therefore the alkaline earth metal component is used in the lower layer.

As the alkaline earth metal component, the Ba component having storing capability of NO$_x$, for example, barium oxide, can be used. It may be added into the catalyst composition as barium oxide, however, as a raw material of the barium component, one selected as appropriate from barium acetate, barium sulfate, barium carbonate, barium nitrate, barium sulfite or the like may be used. The raw material of the NO storing component other than barium oxide is fired in the production step of the honeycomb structure-type catalyst, and finally converted to barium oxide, or a composite material of barium oxide and other barium components.

Barium oxide contained in the catalyst stores NO by generating barium nitrate, Ba(NO$_3$)$_2$, by reacting with NO$_x$. NO stored as Ba(NO$_3$)$_2$ is reductively purified to N$_2$ by a reaction with CO or HC etc., by reversed spill over, when a reducing component such as CO or HC is increased in exhaust gas. In this case CO or HC etc. is also oxidation purified (JP No. 3488487, paragraphs 0005 and 0013).

The alkaline earth metal component is contained in the catalyst composition in an amount of 0.05 to 30 g/L, and desirably 1 to 20 g/L, in an oxide equivalent. The too much amount progresses sintering of the alkaline earth metal, and may not provide effect corresponding to the addition amount. On the contrary, the too less amount may not provide sufficient addition effect of the alkaline earth metal in some cases.

<The Cerium-Containing Oxide>

In the lower layer of the upstream catalyst and the downstream catalyst, cerium-containing oxide, in which the Rh component is not loaded, may be contained. The cerium-containing oxide is contained in the catalyst composition in an amount of 0.5 to 200 g/L, and desirably 1 to 100 g/L. The too much amount increases thickness of the catalyst layer excessively and makes difficult to raise catalyst temperature up to temperature suitable for purification. On the contrary, the too less amount cannot absorb variation of oxygen concentration in exhaust gas sufficiently, and may deteriorate purification performance of NO$_x$. When the cerium-zirconium composite oxide is used as such a cerium-containing oxide, it may be referred to hereafter as CeO$_2$/ZrO$_2$ (B).

CeO$_2$/ZrO$_2$ (B) is not especially limited, however, it preferably has a cerium content of 10 to 70% by weight, and more preferably 30 to 60% by weight, in an oxide equivalent. The too much amount of the cerium component results in sintering at high temperature and may decrease capability as the OSC. In addition, the too less amount may not exert sufficient capability as the OSC.

<The Honeycomb-Type Structure>

In a catalyst to be used in the present invention, the catalyst composition is coated onto the honeycomb-type structure layer-likely. It is preferable that the honeycomb-type structure as such a carrier, is a flow-through-type honeycomb-type structure having a cell density of 10 to 1500 cell/inch$^2$, and in particular, a flow-through-type carrier having a cell density of 300 to 900 cell/inch$^2$. The cell density of equal to or higher than 10 cell/inch$^2$ is capable of securing contact area between exhaust gas and a catalyst required in purification, and providing purification performance of exhaust gas with superior structural strength as well, while the cell density of equal to or lower than 1500 cell/inch$^2$ is capable of sufficiently securing contact area between exhaust gas and the catalyst without largely losing pressure of exhaust gas of an internal combustion engine, and without impairing performance of the internal combustion engine. In particular, in the TWC for a gasoline engine, the flow-through-type carrier having a cell density of 300 to 900 cell/inch$^2$ is preferable in view of suppressing pressure loss. It should be noted that, external shape of the honeycomb-type structure is arbitrary, and can be selected arbitrarily corresponding to a structure of an exhaustion system where a one-piece structure-type carrier is applied, such as a circular column-type with a true circle in cross-section or an ellipse, a tetragonal column-type, a hexagonal column-type.

In addition, a thickness of the cell wall of such a honeycomb-type structure is preferably 2 to 12 mil (mill inch), and more preferably 4 to 8 mil.

Such a honeycomb-type structure includes one whose material is a metal or ceramics. In the case of a metal, one made of stainless steel is general. As a material of ceramics, cordierite, mullite, alumina, magnesia, spinel, silicon carbide or the like is included, however, in view of good formability to produce the honeycomb, and superiority in heat resistance or mechanical strength, it is preferable to be made of cordierite.

3. The Honeycomb Structure-Type Catalyst (X)

In the apparatus of the catalyst for purifying exhaust gas of the present invention, the upper layer of the honeycomb structure-type catalyst (X) as the upstream catalyst, contains the Rh component effective in purification of $NO_x$.

<The Rh Component>

In the catalyst for purifying exhaust gas, in particular, in the TWC, Pt or Pd effective in purification of HC or CO is used in addition to Rh, however, Rh has lower output and is more expensive as compared with Pt or Pd. In the present invention, Rh is used in the upper layer of the honeycomb structure-type catalyst to promote purification of $NO_x$ in exhaust gas by small amount of the Rh component. That is, the Rh component is contained in each catalyst composition in an amount of 0.01 to 2 g/L, and desirably 0.05 to 0.5 g/L. The too much amount may excessively increase concentration of the Rh component, by which sintering of the Rh component may proceed excessively after a durability test in some case, and the Rh component, in which sintering proceeds excessively, decreases surface area, decreases activity, and may not provide performance corresponding to amount of the noble metal. On the contrary, the too less amount may not provide activity necessary in some case. This Rh component is loaded on the following support material of the zirconium oxide, however, a part of the Rh component may be loaded on a material other than the following zirconium oxide, within a range not to obstruct an action of the present invention.

In addition, in this upper layer, the Pt component and the Pd component are not substantially contained. By adopting such a configuration, purification performance of $NO_x$ by the upper layer enhances, as well as alloying between the Pd component and the Rh component in the lower layer can be avoided, and purification performance of HC or CO enhances as well.

<The Zirconium Oxide>

In the present invention, in the upper layer of the catalyst for purifying exhaust gas (X), as a support material loading the Rh component, the catalyst composition containing, an oxide not containing the cerium component and having zirconium oxide as a main component, and the following cerium-containing oxide, is used.

In the upper layer of the upstream catalyst, the zirconium oxide loading the above Rh component is contained in an amount of 1 to 300 g/L, and desirably 15 to 150 g/L. The too much amount may increases thickness of the catalyst layer excessively and makes difficult to raise catalyst temperature up to temperature suitable for purification. In addition, thus thickened catalyst layer obstructs gas diffusion to a deep part of the catalyst layer, resulting in not providing sufficient activity. On the contrary, the too less amount increases concentration of the Rh component in the catalyst composition, resulting in proceeding of sintering of the Rh component, in exposure to high temperature in use, reducing active surface area, and may not providing activity comparable to the use amount in some cases. It should be noted that, this zirconium oxide can be used as a support material loading the above Rh component, however, it can be used also as a hydrogen generating material or a binder, by adding to the catalyst composition.

<The Cerium-Containing Oxide>

The cerium-containing oxide in the upper layer is a cerium-containing oxide as the OSC not loading the Rh component. This cerium-containing oxide may be pure cerium oxide, however, it is preferable to be the cerium-zirconium composite oxide. The cerium-zirconium composite oxide is known as the OSC superior in storing and discharging performance of oxygen, along with heat resistance. In addition, in such a cerium-containing oxide, a rare earth metal element, a typical metal component, a transition metal component, an alkali metal component, an alkaline earth metal component, other than the cerium component and the zirconium component may be contained.

This cerium-zirconium composite oxide is not especially limited, however, content of cerium, in an oxide equivalent, is preferably 10 to 70% by weight and more preferably 30 to 60% by weight. The too much amount of the cerium component results in sintering at high temperature and may decrease capability as the OSC. In addition, the too less amount may not exert sufficient capability as the OSC.

In the upper layer of the upstream catalyst, the cerium-containing oxide not loading the Rh component is contained in an amount of 0.5 to 200 g/L, and desirably 1 to 50 g/L. The too much amount results in increasing thickness of the catalyst layer excessively and makes difficult to raise catalyst temperature up to temperature suitable for purification. In addition, thus thickened catalyst layer obstructs gas diffusion to a deep part of the catalyst layer, resulting in not providing sufficient activity. On the contrary, the too less amount cannot absorb variation of oxygen concentration in exhaust gas sufficiently, and may deteriorate purification performance of $NO_x$ in some cases. When the cerium-zirconium composite oxide is used as an oxide containing such a cerium component, it may be referred to hereafter as $CeO_2/ZrO_2$ (B).

4. The Honeycomb Structure-Type Catalyst (Y)

In the apparatus of the catalyst for purifying exhaust gas of the present invention, in the upper layer of the honeycomb structure-type catalyst (Y) positioned at the downstream side, a support material of the following cerium-zirconium composite oxide loading the Rh component (hereafter may also be referred to as $CeO_2.ZrO_2$ (A)) is included.

The Rh component is contained in each catalyst composition, in an amount of 0.01 to 2 g/L, and desirably 0.05 to 0.5 g/L. And, the Pt component and the Pd component are not substantially contained in this upper layer.

<The Cerium-Zirconium Composite Oxide>

In this cerium-zirconium composite oxide, amount of cerium is 1 to 20% by weight, as converted to an oxide, and amount of zirconium is 99 to 80% by weight, in an oxide equivalent, and preferably amount of cerium is 1 to 10% by weight and amount of zirconium is 99 to 90% by weight. Here, irrespective of the case where amount of the cerium component and the zirconium component is too many or too less, purification performance of $NO_x$ decreases.

In the upper layer of the downstream catalyst, $CeO_2.ZrO_2$ (A) is contained in an amount of 1 to 300 g/L, and desirably 15 to 150 g/L. The too much amount may increases thickness of the catalyst layer excessively and makes difficult to raise catalyst temperature up to temperature suitable for purification. In addition, thus thickened catalyst layer obstructs gas diffusion to a deep part of the catalyst layer, resulting in not providing sufficient activity. On the contrary, the too less amount increases concentration of the Rh component in the catalyst composition, resulting in proceeding of sintering of the Rh component, in exposure to high temperature in use, reducing active surface area of the Rh component, and may not providing activity comparable to the use amount in some cases.

As the zirconium oxide containing the cerium component, to be used in the present invention, a material having a desired cerium/zirconium ratio may be selected from commercial products, however, it may be produced by dissolving cerium nitrate and zirconium oxynitrate with ion-exchanged water, adjusting pH, if necessary, and then by the steps of filtering, washing, drying, calcination and pulverization. In adjustment of the cerium/zirconium ratio, ratio of cerium nitrate and zirconium oxynitrate may be adjusted as appropriate.

<Other Additives>

In the honeycomb structure-type catalyst layer of the present invention, a material such as a binder may be used in a range not to suppress an action of the present invention. As such a material, alumina, zirconia, silica, titania, silica-alumina, carious kinds of zeolites or the like is included.

5. Preparation of the Honeycomb Structure-Type Catalyst

<A Raw Material of the Noble Metal Component and a Loading Method>

As the raw material of the noble metal component of the honeycomb structure-type catalyst relevant to the present invention, a compound such as nitrate, sulfate, carbonate, acetate of Rh, Pt and Pd is used. Specifically, chloroplatinic acid (IV), diammineplatinum (II) nitrite, a solution of amine platinate hydroxide, chloroplatinic acid, diammine dinitro palladium, palladium nitrate, palladium chloride, rhodium (III) chloride, rhodium (III) nitrate or the like is included.

In addition, in order to load the noble metal component onto an inorganic support material such as alumina or a zirconium-type oxide, it may be performed by a known method such as impregnating the above raw material of the noble metal component into a support material, loading by anion exchanging method, or kneading the support material and the raw material of the noble metal component.

<The Alkaline Earth Metal Component>

As the alkaline earth metal component, the Ba component is preferable and, for example, barium oxide can be used. It may be added into the catalyst composition as barium oxide, however, it may be selected as appropriate from barium acetate, barium sulfate, barium carbonate, barium nitrate, barium sulfite or the like. The raw material of the $NO_x$ storing component other than barium oxide is fired in the production step of the honeycomb structure-type catalyst, and finally converted to barium oxide, or a composite material of barium oxide and other barium components.

<Wash Coat of the Honeycomb-Type Structure>

Next, the inorganic support material loading the noble metal catalyst component by the above method is converted to a slurry-like mixture by mixing with other catalyst component and a binder, along with an aqueous medium, and then coated onto the honeycomb-type structure (it may also be referred to as one piece structure-type carrier), dried and fired.

The slurry-like mixture differs in kind of the noble metal catalyst component, or presence or absence of the alkaline earth metal, depending on those for catalyst lower layer, upstream catalyst upper layer, and downstream catalyst upper layer, therefore at least three kinds must be prepared. The aqueous medium is used in an amount which is capable of dispersing uniformly the inorganic support material loading the noble metal catalyst component in the slurry.

In preparing the slurry, an acid or an alkali may be formulated to adjust pH, if necessary, or a surfactant, a resin for dispersing or the like may be formulated to adjust viscosity or enhance slurry dispersing property. As a mixing method for the slurry, pulverization mixing by a ball mill or the like is applicable, however, other pulverization or a mixing method may also be applied.

Next, the slurry-like mixture is coated onto the one piece structure-type carrier. The coating method is not especially limited, however, a wash coat method is preferable. After the coating, by performing drying and calcination, the honeycomb structure-type catalyst loading the catalyst composition can be obtained. It should be noted that, drying temperature is preferably 100 to 300° C., and more desirably 100 to 200° C. In addition, calcination temperature is 300 to 1200° C., preferably 400 to 800° C. and particularly preferably 400 to 600° C. Heating means may be performed by a known heating means such as an electric furnace, a gas furnace.

The above coating, drying, and calcination on the honeycomb-type structure may be repeated every the catalyst composition to form the upper layer and the lower layer, or by performing slurry coating sequentially and finally drying and calcination may be performed.

The honeycomb structure-type catalyst to be used in the present invention is composed of the upper layer and the lower layer where the catalyst composition is coated on the honeycomb-type structure, however, a coating layer may be provided separately, if necessary, at still more the lower side of the lower layer, or between the upper layer and the lower layer, or at still more upper side of the upper layer. As the coating layer to be provided separately, there may be provided a base coat layer to make bonding among the catalyst layer, the honeycomb-type structure and the catalyst layer firmly, or a catalyst layer with different composition, in a range not to obstruct an action of the present invention.

6. Use as the TWC

In the apparatus of the catalyst for purifying exhaust gas of the present invention, the Pt component or the Pd component as an oxidative active species, as well as the Rh component as a reductive active species are used, along with the OSC, therefore it is preferable that it is arranged in a flow passage of exhaust gas exhausted from an automotive gasoline engine operated in a state where fuel concentration of mixed air repeats a lean state and a rich state, to form the TWC for purifying HC, CO and $NO_x$.

Sulfur content has been decreasing year by year in commercial gasoline, therefore according to the present invention, a cheap and high performance catalyst apparatus can be provided using the Pd component as a major oxidative active species.

Reason that purification of NOx is promoted in the present invention is considered that the following action influences on the catalyst composition of the upper layer of the upstream catalyst (hereafter may be referred to as $Rh/[ZrO_2]$+ $CeO_2.ZrO_2$ (B). $Rh/[ZrO_2]$ indicates that the Rh component is loaded on $ZrO_2$) of the essential components of the present invention, and the catalyst composition of the upper layer of the downstream catalyst (hereafter may be referred to as $Rh/[CeO_2.ZrO_2(A)]$. $Rh/[CeO_2.ZrO_2(A)]$ indicates that the Rh component is loaded on $CeO_2.ZrO_2(A)$) of the essential components of the present invention, so that purification of NOx in exhaust gas is promoted.

<About the Rh Component in the Catalyst>

The Rh component has two cases: one where it is present as rhodium oxide, and the other where it is present as metal rhodium not yet oxidized. And, catalytic activity is said higher in metal rhodium than in rhodium oxide.

As for relation between the Rh component and a support material, when the support material is the cerium-zirconium composite oxide, the Rh component is loaded on cerium oxide and zirconium oxide. The Rh component on cerium oxide tends to become rhodium oxide by bonding with oxygen discharged from cerium oxide, whereas the Rh component on zirconium oxide is difficult to be oxidized and is considered to be present as metal rhodium in many cases.

<Characteristics of Rh/[ZrO$_2$]>

Zirconium is a transition metal element capable of storing and discharging of oxygen, and an oxide thereof may act as the OSC in some cases, however, ZrO$_2$ is inferior to CeO$_2$ in capability as the OSC. However, ZrO$_2$ rarely promotes oxidation of the Rh component, because of low capability as the OSC. Rhodium oxide rarely reduces amount of active metal rhodium in the Rh component loaded on ZrO$_2$, because of inferior activity to metal rhodium, and thus it is considered that a state of high purification activity of NO$_x$ is maintained.

It is considered that zirconium oxide promotes purification of NOx by a steam reforming reaction by interaction with the Rh component, and exerts superior purification performance of NOx when it becomes Rh/[ZrO$_2$].

<Characteristics of Rh/[ZrO$_2$]+CeO$_2$.ZrO$_2$ (B)>

As described above, in Rh/[ZrO$_2$]+CeO$_2$.ZrO$_2$ (B) where CeO$_2$.ZrO$_2$ (B) is present in the same composition, while having high reducing activity of Rh/[ZrO$_2$], capability as the OSC is also exerted. The OSC also acts adsorption of an oxygen atom of NO$_x$, as well as oxygen storage. By the Rh component and the OSC being present at a near position, oxygen concentration in exhaust gas is adjusted and purification of NOx is promoted by the Rh component.

<Characteristics of Rh/[CeO$_2$]>

CeO$_2$ acts as the OSC, and the Rh component has an action to bond with oxygen, because of being an oxidative active species as well. CeO$_2$ loaded the Rh component (hereafter may be referred to as Rh/[CeO$_2$]) is used as a catalyst at the downstream side, and the Rh component promotes storage of oxygen to cerium oxide. In addition, the Rh component promotes discharge of oxygen for Ce$_2$O$_3$ converted to CeO$_2$ by storage of oxygen. The action to promote storage and discharge of oxygen in this OSC is considered to work also for an oxygen atom of NO$_x$. That is, it prevents exhaustion of NO$_x$ by temporal adsorption of NO$_x$ unable to purify, onto CeO$_2$. And, it purifies NO$_x$ by discharging NO$_x$ adsorbed, when oxygen concentration in exhaust gas is low and a reducing component is more. It should be noted that, when storage and discharge of oxygen is performed here from CeO$_2$, this oxygen is utilized as active oxygen to purification of HC or CO by the Pt component and the Pd component.

In addition, it is desirable that purification of NO$_x$ by the Rh component is performed in a state that concentration of the reducing component in exhaust gas is high to some extent. This state is also, in other words, exhaust gas in a state where oxygen concentration is low. Such exhaust gas includes exhaust gas combusted at the vicinity of theoretical air/fuel ratio. Because CeO$_2$ stores oxygen in exhaust gas, it has an action to store oxygen at the vicinity of the Rh component and increase concentration of the reducing component. Although Rh/[CeO$_2$] has fear of decreasing activity by oxidation of the Rh component, it is considered that purification of NOx is promoted also by such an action.

<Characteristics of Rh/[CeO$_2$.ZrO$_2$ (A)]>

Rh/[CeO$_2$.ZrO$_2$ (A)] in the present catalyst can also be said a state that Rh/[CeO$_2$] and Rh/[ZrO$_2$] are present together. It is considered that purification of NOx is promoted by interaction of adsorption and discharge of NO$_x$ by Rh/[CeO$_2$], and reduction of NO$_x$ by Rh/[ZrO$_2$] by this state. In addition, the cerium-zirconium composite oxide is also a material superior in heat resistance, therefore is considered that it can suppress degeneration of the Rh component leading to decrease in activity, such as sintering, and stable purification performance of NOx is exerted, even when the Rh component is loaded.

It should be noted that, because storage and discharge of oxygen are also performed in CeO$_2$.ZrO$_2$ (A), it is without saying that also purification of HC or CO is promoted in the lower layer.

<Interaction of Rh/[ZrO$_2$]+CeO$_2$ and Rh/[CeO$_2$.ZrO$_2$ (A)]>

According to the above consideration, it can be said that Rh/[ZrO$_2$]+CeO$_2$, Rh/[CeO$_2$.ZrO$_2$ (A)] are catalysts each having different activity. In the apparatus of the catalyst for purifying exhaust gas of the present invention, it is considered that high purification performance of NO$_x$ is exerted by interaction of such activity difference.

In a state where variation of air/fuel ratio is large as in a running state of an automobile, oxygen concentration of exhaust gas varies largely. In the present invention, because the OSC having high capability of storage and discharge of oxygen is used in the catalyst layer having a purification action of NO$_x$, purification of NO$_x$ and buffering of variation of oxygen concentration are performed at the same time to reduce concentration of NO$_x$ in exhaust gas and adjusted to a concentration region (a window region) of reducing components, where the downstream catalyst exerts high purification activity.

In other words, exhaust gas combusted in a state, where variation of air/fuel ratio is large, cannot be purified sufficiently only by the upstream catalyst, however, in the present invention, by combination with the downstream catalyst, it is purified substantially.

It should be noted that, both in the upstream catalyst and in the downstream catalyst, not only the upper layer but also the lower layer contribute to purification of exhaust gas, and it goes without saying that not only the above components but also interaction with other catalyst components are related in a complicated manner.

Such an action is the same, even when Rh/[ZrO$_2$]+CeO$_2$ is Rh/[ZrO$_2$]+CeO$_2$.ZrO$_2$ (B), and a catalyst composition with high heat resistance can be obtained by using CeO$_2$.ZrO$_2$ (B) instead of CeO$_2$.

Figure 3:
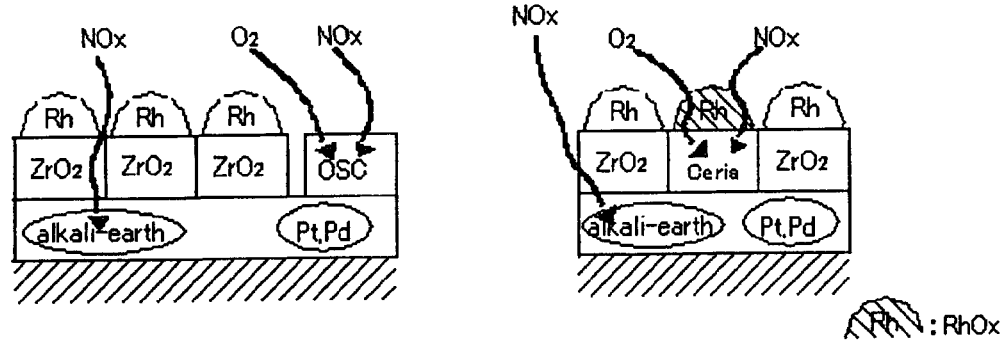
FIG. 3 (a)-(c) are explanation drawings representing main reactions supposed in basic catalyst composition of a honeycomb structure-type catalyst relevant to the present invention.
Figure 3:
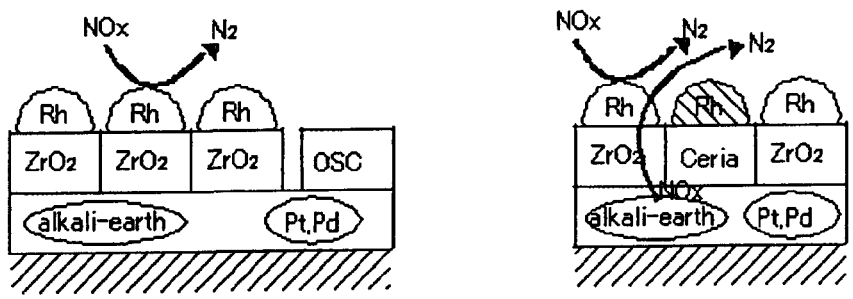
Figure 3:
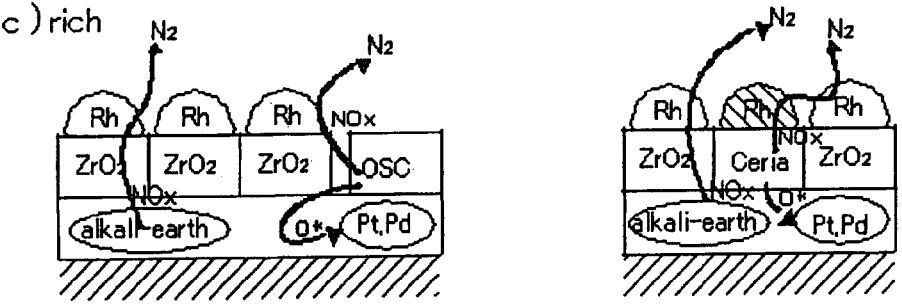
Figure 4:
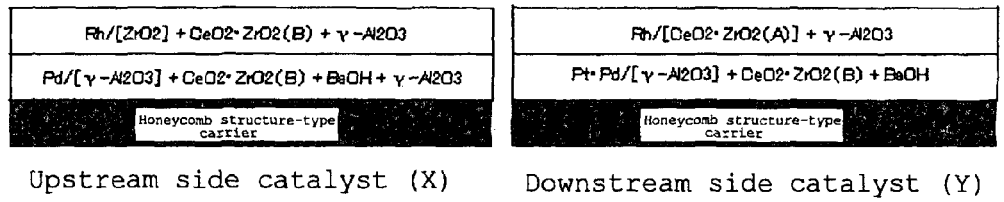
FIG. 4 is a schematic drawing representing specific catalyst composition of a honeycomb structure-type catalyst (Example 1) relevant to the present invention.
Figure 5:
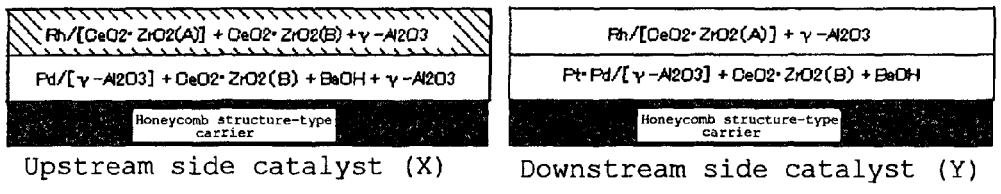
FIG. 5 is a schematic drawing representing a specific catalyst composition of a honeycomb structure-type catalyst (Comparative Example 1) for comparison.
Figure 6:
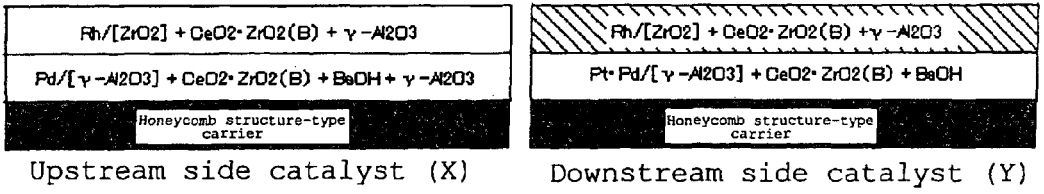
FIG. 6 is a schematic drawing representing a specific catalyst composition (Comparative Example 2) of a honeycomb structure-type catalyst for comparison.
Figure 7:
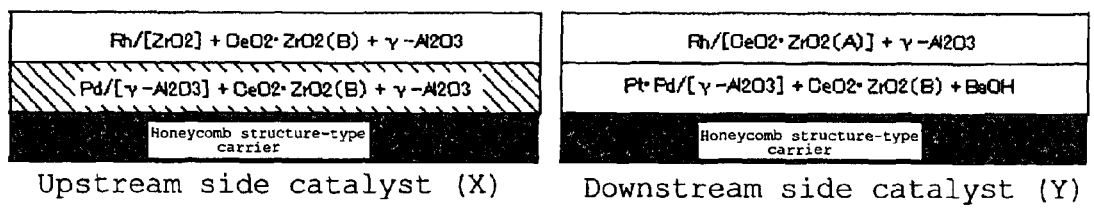
FIG. 7 is a schematic drawing representing a specific catalyst composition (Comparative Example 3) of a honeycomb structure-type catalyst for comparison.
Figure 8:
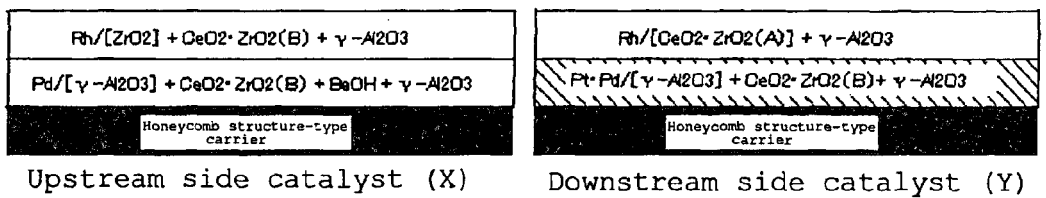
FIG. 8 is a schematic drawing representing a specific catalyst composition of a honeycomb structure-type catalyst (Comparative Example 4) for comparison.

Explanation will be given below on reaction mechanism using the catalyst relevant to the present invention, mainly on purification of NO$_x$, with reference to a schematic drawing (FIG. 3). It should be noted that, a purification action of NO$_x$ in an automotive catalyst proceeds via various reaction routes, under interaction of the catalyst components. FIG. 3 shows major reactions thereof. In addition, it goes without saying that in the TWC, purification of HC or CO is also performed at the same time by an action of the Pt component and the Pd component. In this drawing, "lean" indicates a state where an engine is operated in a lean combustion state, "rich" indicates a state where an engine is operated in an excess fuel state, and "stoichiometric" indicates a state where an engine is operated at the vicinity of a theoretical air/fuel ratio. "stoichiometric" is said to be a window region in the present invention.

The a) in FIG. 3 is a lean combustion state (lean), and in the upstream catalyst, oxygen in exhaust gas is stored and NO$_x$ is adsorbed by the OSC of the upstream and the cerium-containing component (not shown) of the lower layer. In addition, NO$_x$ is stored by the alkaline earth metal component contained in the lower layer.

In the downstream side catalyst, the Rh component is loaded also on Ceria (CeO$_2$), and storage of oxygen and adsorption of NO$_x$ are promoted via the Rh component. In addition, also in the lower layer, alkali-earth (the alkaline earth metal) component is contained, and NO$_x$ is stored. Here, it is considered that, because amount of reducing components in exhaust gas is low, $NO_x$ in exhaust gas is purified by adsorption or storage rather than decomposition of $NO_x$.

The b) in FIG. 3 shows a purification process of exhaust gas exhausted from a combustion state (stoichiometric) in theoretical air/fuel ratio. The Rh component loaded on $ZrO_2$ purifies $NO_x$ to $N_2$ by the reducing components in exhaust gas at the active metal surface. Although not shown in the drawing, as for purification of $NO_x$, reduction of $NO_x$ is promoted by the reducing components in exhaust gas or a hydrogen atom generated by a steam reforming reaction. The reducing components in exhaust gas generate by incomplete combustion of fuel, and component concentration thereof is low in a lean state.

In addition, when $NO_x$ concentration in exhaust gas decreases, $NO_x$ stored by the alkali-earth is discharged by chemical equilibrium. The Ba component converted to barium nitrate by storing $NO_x$ discharges $NO_x$ by exchanging with CO in exhaust gas. As for $NO_x$ discharged, purification of $NO_x$ is promoted by an action of the reducing components in exhaust gas or the Rh component (the Rh component loaded on $ZrO_2$).

In addition, it is considered that variation of oxygen concentration in exhaust gas is buffered, and a state of a window region, where purification of NOx is promoted, (here, stoichiometric) is maintained for a long period, by the OSC in the catalyst composition of the present invention, and thus purification of $NO_x$ is promoted.

The c) in FIG. 3 shows a purification action by mainly Ceria in exhaust gas in a state where fuel is excess (rich). In the rich state, exhaust gas becomes reducing atmosphere. In the upstream catalyst, oxygen stored in the OSC is discharged as active oxygen (O*), and oxidizes HC or CO (not shown) by the Pt component and the Pd component. And, $NO_x$, which had adsorbed on the OSC, is discharged and reduced by contacting with the Rh component having active metal surface.

In the downstream side catalyst, by the Rh component loaded on the Ceria, discharge of oxygen in the Ceria, and discharge of $NO_x$ are promoted. Active oxygen "O*" discharged is supplied to an oxidation (not shown) of HC or CO in the Pt component and the Pd component. In addition, it is considered that, $NO_x$ discharged is reduced by contacting with the Rh component having active metal surface, via the Rh component on the Ceria.

Such purification of NOx is promoted in a rich state where amount the reducing components is high, and in a stoichiometric state.

As described above, an important function in the TWC is a purification function of $NO_x$. As one of $NO_x$ purification reactions, there is a reaction in which hydrogen generated by other reaction reduces $NO_x$ adsorbed at active sites. As such a reaction for generating a hydrogen, which occurs in automotive exhaust gas, a steam reforming reaction and a water gas shift reaction are known. Among them, the water gas shift reaction is one for generating hydrogen according to the following formula (1) by utilizing CO in exhaust gas, and it is promoted at relatively low temperature (JP-A-2007-196146, paragraph 0008, or the like). In addition, generation of hydrogen by the water gas shift reaction is promoted in the presence of Pt (JP-A-2006-68651, paragraph 0034, or the like).

$$CO+H_2O \rightarrow CO_2+H_2 \qquad (1)$$

Here, as compared with the upstream catalyst which contacts with exhaust gas directly and tends to become high temperature, in the downstream catalyst contacting with exhaust gas with buffered temperature by the upstream catalyst, the catalyst temperature rises mildly. Accordingly, in the present invention, it is effective in the case of purification of $NO_x$, that the water gas shift reaction is progressed by using Pt in hydrogen generation in the downstream catalyst, and the steam reforming reaction is progressed in the upstream catalyst.

It should be noted that, when request for purification performance of $NO_x$ is not so high, the downstream catalyst and a noble metal in the lower layer may be only Pd.

EXAMPLES

Examples and Comparative Examples will be shown below, to still more clarify features of the present invention, however, the present invention should not be limited to these Examples. The honeycomb structure-type catalyst to be used in Examples and Comparative Examples were produced by a method shown below.

[Catalyst Composition Slurry-1]

An aqueous solution of palladium nitrate (concentration: 20% by weight)

γ-alumina (specific surface area value: 220 m²/g) [γ-$Al_2O_3$]

Barium hydroxide [Ba(OH)$_2$]

Cerium-zirconium composite oxide [$CeO_2.ZrO_2$ (B)] (weight ratio in an oxide equivalent, Ce/Zr=1)

Water

γ-alumina was impregnation treated into an aqueous solution of palladium nitrate. Then by drying and removing moisture, powdery palladium-loaded γ-alumina (Pd/[γ-$Al_2O_3$]) was obtained. By mixing this Pd/[γ-$Al_2O_3$], barium hydroxide, γ-alumina as a binder, and the cerium-zirconium composite oxide (B) ($CeO_2/ZrO_2$=1, in an oxide equivalent), together with a suitable amount of aqueous medium in a ball mill, the catalyst composition slurry-1 was prepared.

It should be noted that, barium hydroxide was used as a raw material of the barium component, to become barium oxide, barium carbonate or barium hydroxide, or a composite oxide containing barium oxide and barium carbonate, in the calcination step, the durability step or the use process of the catalyst to be described below.

[Catalyst Composition Slurry-2]

An aqueous solution of rhodium nitrate (concentration: 8% by weight)

Zirconium oxide [$ZrO_2$]

γ-alumina (specific surface area value: 220 m²/g), [γ-$Al_2O_3$]

Cerium-zirconium composite oxide [$CeO_2.ZrO_2$ (B)] (weight ratio in an oxide equivalent, Ce/Zr=1)

Water

Zirconium oxide was impregnation treated into an aqueous solution of rhodium nitrate. Then by drying and removing moisture, powdery rhodium-loaded zirconium oxide (Rh/[$ZrO_2$]) was obtained. By mixing this Rh/[$ZrO_2$], γ-alumina as a binder and $CeO_2.ZrO_2$ (B), together with a suitable amount of aqueous medium in a ball mill, the catalyst composition slurry-2 was prepared.

[Catalyst Composition Slurry-3]

An aqueous solution of diammineplatinum (II) nitrite (20% by weight)

An aqueous solution of palladium nitrate (28% by weight)

γ-alumina (specific surface area value: 220 m²/g) [γ-$Al_2O_3$]

Barium hydroxide [Ba(OH)$_2$]

Cerium-zirconium composite oxide [$CeO_2.ZrO_2$ (B)] (weight ratio in an oxide equivalent, Ce/Zr=1)

Water

γ-alumina was impregnation treated into an aqueous solution of diammineplatinum (II) nitrite and an aqueous solution of palladium nitrate. Then by drying and removing moisture, powdery platinum/palladium-loaded γ-alumina was obtained.

By mixing this Pt.Pd/[γ-Al$_2$O$_2$] and similarly as in the catalyst composition slurry-1, barium hydroxide as a raw material of the barium component, and CeO$_2$.ZrO$_2$ (B), together with a suitable amount of aqueous medium in a ball mill, the catalyst composition slurry-3 was prepared.

[Catalyst Composition Slurry-4]

An aqueous solution of rhodium nitrate (8% by weight)

Cerium-zirconium composite oxide [CeO$_2$.ZrO$_2$ (A)] (weight ratio in an oxide equivalent, CeO$_2$/ZrO$_2$=0.1)

γ-alumina (specific surface area value: 220 m$^2$/g) [γ-Al$_2$O$_3$]

Ce/Zr (A) was impregnation treated into an aqueous solution of rhodium nitrate. Then by drying and removing moisture, powdery rhodium loaded Ce/Zr (A) (this is referred to as Rh/[CeO$_2$.ZrO$_2$ (A)]) was obtained. By mixing this Rh/[CeO$_2$.ZrO$_2$ (A)] and γ-alumina as a binder, together with a suitable amount of aqueous medium in a ball mill, the catalyst composition slurry-4 was prepared.

[Catalyst Composition Slurry-5]

The catalyst composition slurry-5 was prepared similarly as in the catalyst composition slurry-2, except that zirconium oxide, [ZrO$_2$], of the catalyst composition slurry-2 was replaced with CeO$_2$.ZrO$_2$ (A).

[Catalyst Composition Slurry-6]

The catalyst composition slurry-6 was prepared similarly as in the catalyst composition slurry-4, except that CeO$_2$.ZrO$_2$ (A) of the catalyst composition slurry-4 was replaced with [ZrO$_2$], and CeO$_2$.ZrO$_2$ (B) was added to adjust amount of cerium.

[Catalyst Composition Slurry-7]

The catalyst composition slurry-7 was prepared similarly as in the catalyst composition slurry-1, except that barium hydroxide [Ba(OH)$_2$] of the catalyst composition slurry-1 was replaced with γ-alumina as a binder.

[Catalyst Composition Slurry-8]

The catalyst composition slurry-8 was prepared similarly as in the catalyst composition slurry-3, except that barium hydroxide [Ba(OH)$_2$] of the catalyst composition slurry-3 was replaced with γ-alumina as a binder.

The catalyst composition slurry obtained in this way was each coated on the following flow-through-type honeycomb carrier as the lower layer or the upper layer, by a wash coat method, and then via drying and calcination, the honeycomb structure-type catalyst was obtained.

[The Honeycomb-Type Structure for the Upstream Catalyst]
Cell density: 900 cell/inch
Wall thickness: 2.5 mil
Length: 50 mm
Diameter: 118.4 mm
Material: cordierite

[The Honeycomb-Type Structure for the Downstream Catalyst]
Cell density: 600 cell/inch
Wall thickness: 4.3 mil
Length: 91 mm
Diameter: 118.4 mm
Material: cordierite

[Drying]
Temperature: 150° C.
Drying time: 1 hr

[Calcination]
Temperature: 500° C.
Calcination time: 2 hr

[The Durability Test Conditions for the Catalyst]
An engine used: a 2.4 L gasoline engine
Duration test mode: a stoichiometric mode+fuel cut
Catalyst maximal temperature: 950° C.

By arranging the honeycomb catalysts obtained in this way in a flow passage of exhaust gas, the apparatus of the catalyst for purifying exhaust gas corresponding to Examples and Comparative Examples were configured. Composition of each catalyst material and amount of the catalyst component are shown in the following Table 1. Numerals shown in a parenthesis in Table 1 is content of the catalyst component per unit volume, in the honeycomb structure-type catalyst.

TABLE 1

| | | | Composition and amount of components |
|---|---|---|---|
| Example 1 | Upstream | Upper layer | Catalyst composition slurry-2<br>Rh(0.3)/[ZrO2(70) + CeO2•ZrO2(B)(1G)] + γ-Al2O3(25) |
| | | Lower layer | Catalyst composition slurry-1<br>Pd(6.5)/[γ-Al2O3(75)] + CeO2•ZrO2(B)(29)] + Ba(OH)(5) + γ-Al2O3(15) |
| | Downstream | Upper layzer | Catalyst composition slurry-4<br>Rh(0.5)/[CeO2•ZrO2(A)(70)] + γ-Al2O3(30) |
| | | Lower layer | Catalyst composition slurry-3<br>Pt(0.1)•Pd (0.6)/[γ-Al2O3(40)] + CeO2•ZrO2(B)(2G) + BaOH (5) |
| Comparative Example 1 | Upstream | Upper layer | Catalyst composition slurry-5<br>Rh(0.3)/[CeO2•ZrO2(A)(70)] + CeO2•ZrO2(B)(10) + γ-Al2O3(25) |
| | | Lower layer | Catalyst composition slurry-1<br>Pd(6.5)/[γ-Al2O3(75)]+ CeO2•ZrO2(B)(20) + BaOH(5) + γ-Al2O3(16) |
| | Downstream | Upper layer | Catalyst composition slurry-4<br>Rh(0.3)/[CeO2•ZrO2(A)(70)] + γ-Al2O3(80) |
| | | Lower layer | Catalyst composition slurry-3<br>Pt(0.1)•Pd (0.6)/[γ-Al2O3(40)] + CeO2•ZrO2(B)(7G) + BaOH (5) |
| Comparative Example 2 | Upstream | Upper layer | Catalyst composition slurry-2<br>Rh(0.5)/[ZrO2(70)] + CeO2•ZrO2(B)(10) + γ-Al2O3(25) |
| | | Lower layer | Catalyst composition slurry-1<br>Rd(6.5)/[γ-Al2O3(76)] + CeO2•ZrO2(B)(20) + BaOH(5) + γ-Al2O3(15) |
| | Downstream | Upper layer | Catalyst composition slurry-6<br>Rh(0.3)/[ZrO2(70)] + CeO2•ZrO2(B)(10) + γ-Al2O3(25) |
| | | Lower layer | Catalyst composition slurry-3<br>Pt(0.1)•Pd (0.6)/[γ-Al2O3(40)] + CeO2•ZrO2(B)(70) + BaOH (5) |

TABLE 1-continued

| | | | Composition and amount of components |
|---|---|---|---|
| Comparative Example 3 | Upstream | Upper layer | Catalyst composition slurry-2 Rh(0.5)/[ZrO2(70)] + CeO2•ZrO2(B)(10) + γ-Al2O3(25) |
| | | Lower layer | Catalyst composition slurry-7 Pd(6.5)/[γ-Al2O3(75)] + CeO2•ZrO2(B)(20) + γ-Al2O3(20) |
| | Downstream | Upper layer | Catalyst composition slurry-4 Rh(0.3)/[CeO2•ZrO2(A)(70)] + γ-Al2O3(30) |
| | | Lower layer | Catalyst composition slurry-3 Pt(0.1)•Pd (0.6)/[γ-Al2O3(40)] + CeO2•ZrO2(B)(70) + BaOH (8) |
| Comparative Example 4 | Upstream | Upper layer | Catalyst composition slurry-2 Rh(0.3)/[ZrO2(70)] + CeO2•ZrO2(B)(10) + γ-Al2O3(25) |
| | | Lower layer | Catalyst composition slurry-1 Pd(6.5)/[γ-Al2O3(75)] + CeO2•ZrO2(B)(20)] + BaOH(5) + γ-Al2O3(15) |
| | Downstream | Upper layer | Catalyst composition slurry-4 Rh(0.5)/[CeO2•ZrO2(A)(70)] + γ-Al2O3(30) |
| | | Lower layer | Catalyst composition slurry-6 Pt(0.1)•Pd (0.6)/[γ-Al2O3(40)] + CeO2•ZrO2(B)(70) + γ-Al2O3 (5) |
| Comparative Example 5 | Upstream | Upper layer | Catalyst composition slurry-4 Rh(0.3)/[CeO2•ZrO2(A)(70)] + γ-Al2O3(50) |
| | | Lower layer | Catalyst composition slurry-3 Pt(0.1)•Fo (0.6)/[γ-Al2O3(40)] + CeO2•ZrO2(B)(70) + BaOH(5) |
| | Downstream | Upper layer | Catalyst composition slurry-2 Rh(0.5)/[ZrO2(70)] + CeO2•ZrO2(B)(10) + γ-Al2O3 (25) |
| | | Lower layer | Catalyst composition slurry-1 Pd (6.5)/[γ-Al2O3(75)] + CeO2•ZrO2(B)(20) + BaOH (5) + γ-Al2O3 (15) |

Figure 9:
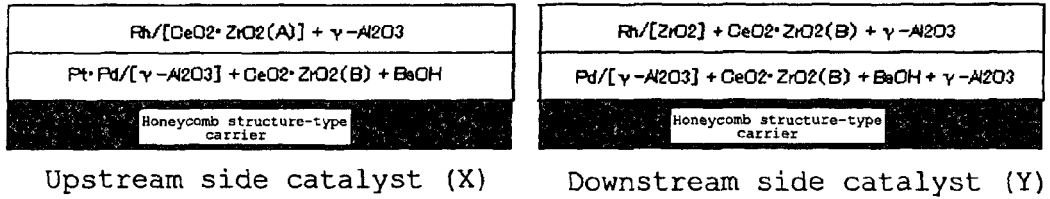
FIG. 9 is a schematic drawing representing a specific catalyst composition of a honeycomb structure-type catalyst (Comparative Example 5) for comparison.

As for Examples and Comparative examples, schematic drawings of the honeycomb structure-type catalyst are shown as FIG. 4 to FIG. 9. In these drawings, in Comparative examples, a composition part different from Example 1 is shown by an oblique line. It should be noted that, FIG. 9 is a configuration where the catalyst composition slurry in Example 1 was replaced for the upstream catalyst and the downstream catalyst.

By providing the honeycomb structure-type catalysts of Examples and Comparative Examples obtained in this way, in a flow passage of exhaust gas, purification performance of exhaust gas was evaluated under the following measurement conditions. Specifically, JC08 mode evaluation was performed by a chassis dynamo, using a commercial vehicle mounted with a gasoline engine of 2.4 L displacement.

The JC08 mode is a running mode of a vehicle, and a running mode where acceleration is not constant but changed delicately to both of a plus side and a minus side. As compared with a well known 10.15 mode, it can be said to have a content nearer to a practical running pattern, and all exhaust gas exhausted from a vehicle to be tested are measured.

Figure 10:
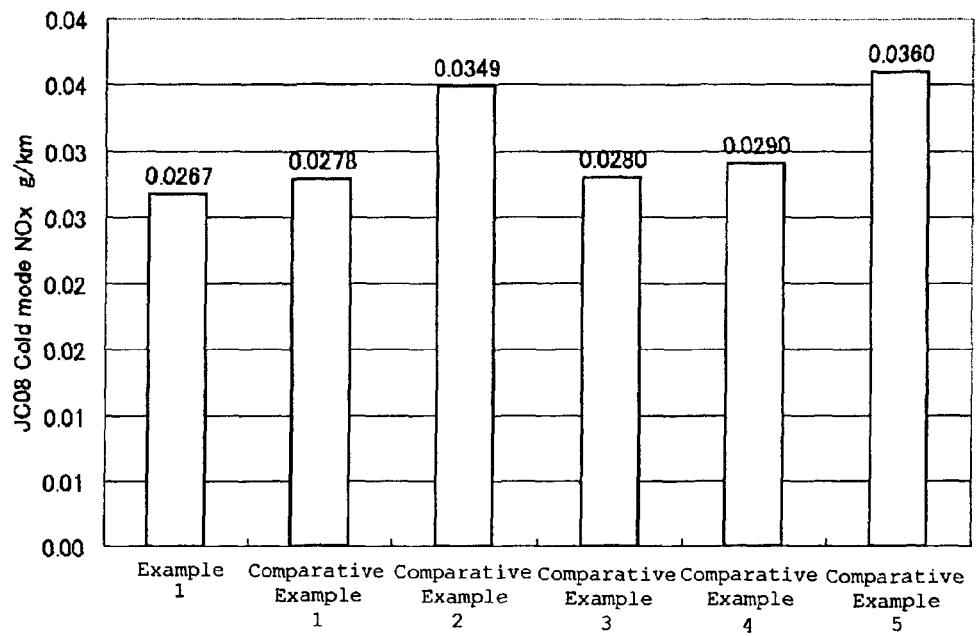
FIG. 10 is a graph representing purification rate of $NO_x$ when exhaust gas was treated in cold start, using a honeycomb structure-type catalyst relevant to the present invention and a comparative catalyst.
Figure 11:
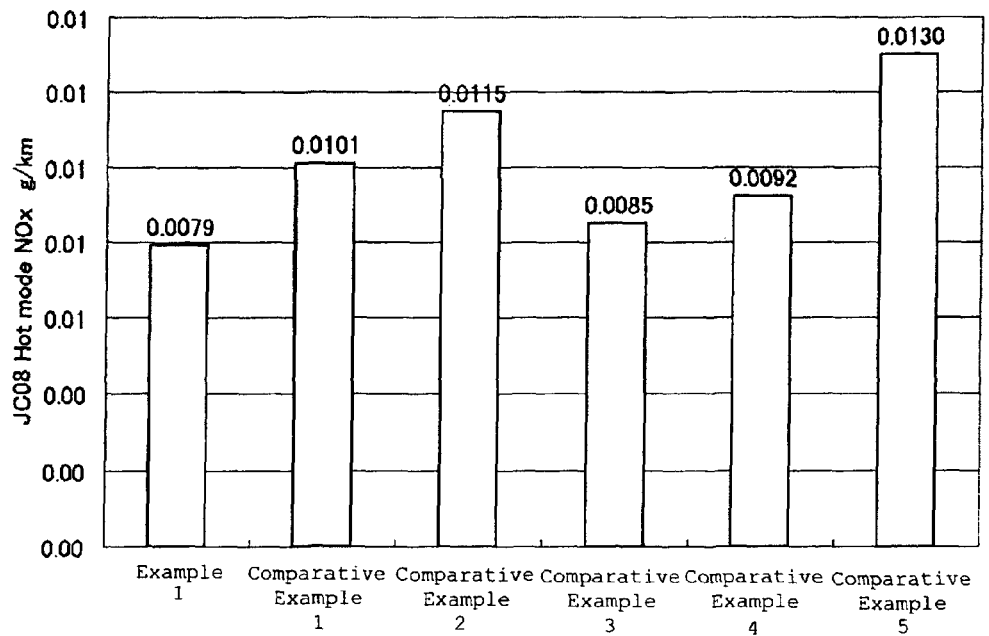
FIG. 11 is a graph representing purification rate of $NO_x$ when exhaust gas was treated in hot start, using a honeycomb structure-type catalyst relevant to the present invention and a comparative catalyst.
Figure 12:
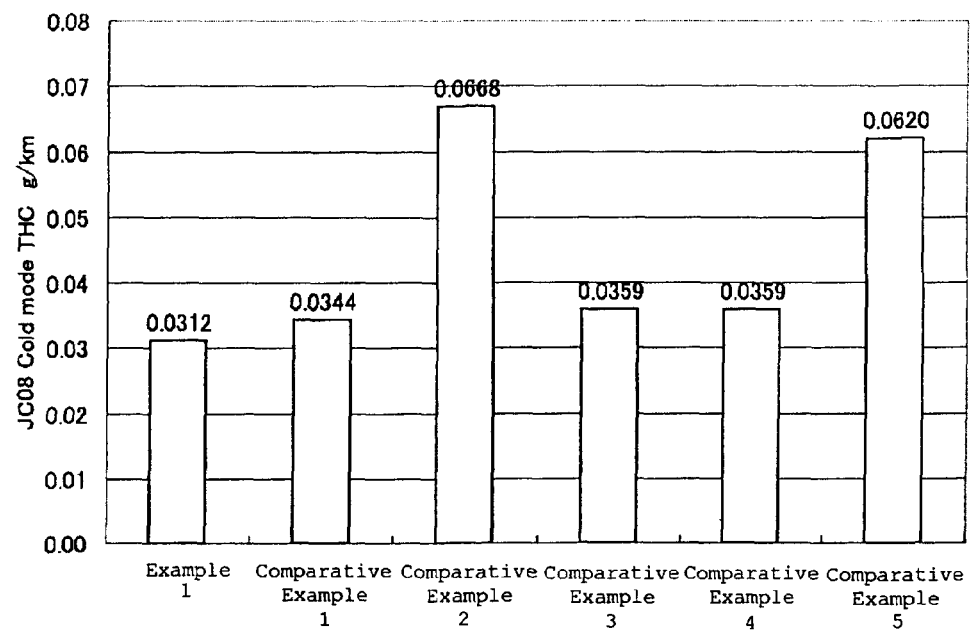
FIG. 12 is a graph representing purification rate of total HC when exhaust gas was treated in cold start, using a honeycomb structure-type catalyst relevant to the present invention and a comparative catalyst.

In the JC08 mode, the test is performed in both of a state that an engine has been warmed in advance (hot start), and a state that an engine is in a completely cold state (cold start). Amount of discharge of $NO_x$ in the cold start is shown in FIG. 10, amount of discharge of $NO_x$ in the hot start is shown in FIG. 11, amount of discharge of THC (total hydrocarbon) in the cold start is shown in FIG. 12, and amount of THC (total hydrocarbon) in the hot start is shown in FIG. 13.

Figure 13:
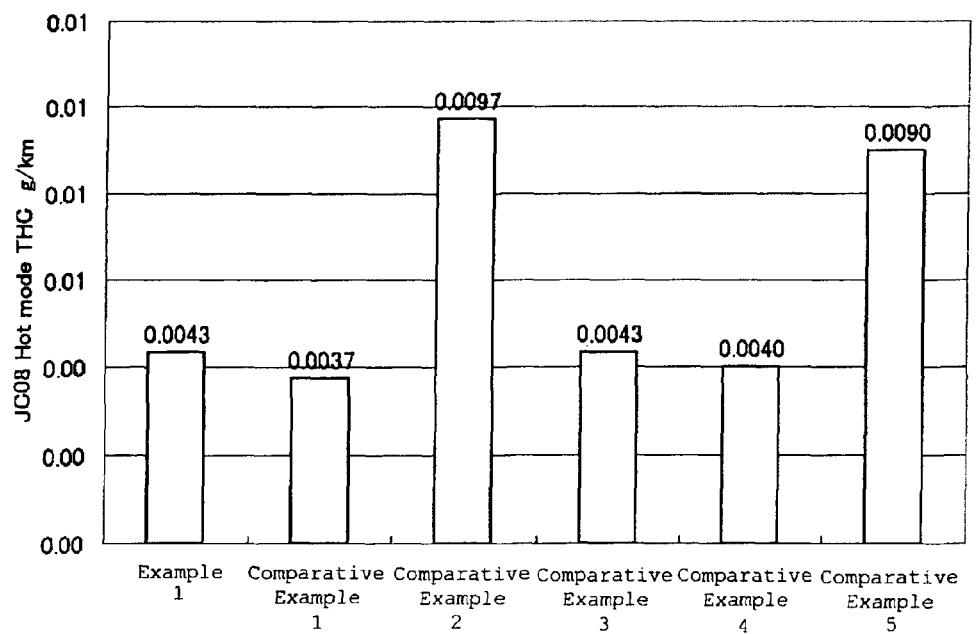
FIG. 13 is a graph representing purification rate of total HC when exhaust gas was treated in hot start, using a honeycomb structure-type catalyst relevant to the present invention and a comparative catalyst.
Figure 14:
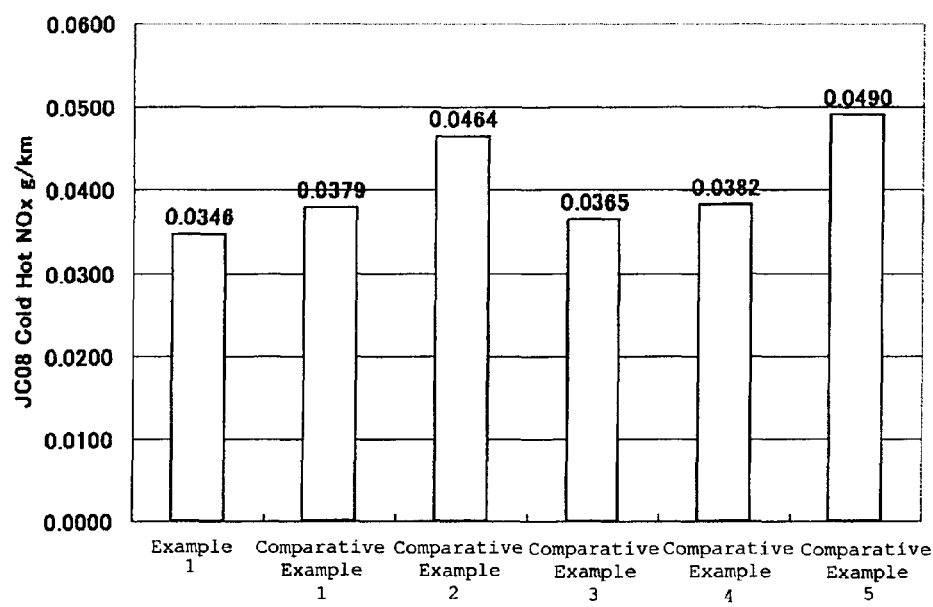
FIG. 14 is a graph representing general purification rate of $NO_x$ when exhaust gas was treated, using a honeycomb structure-type catalyst relevant to the present invention and a comparative catalyst.
Figure 15:
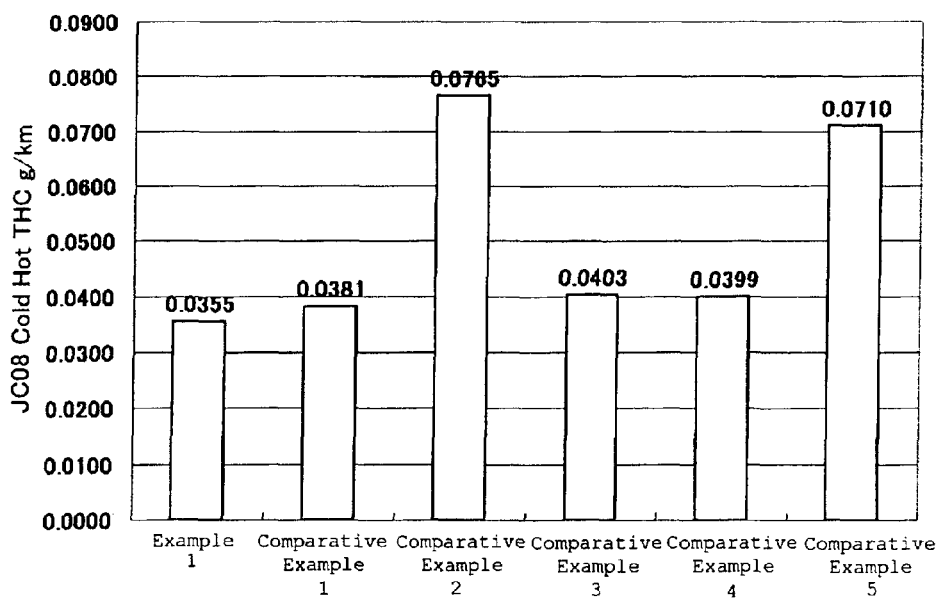
FIG. 15 is a graph representing comprehensive purification rate of total HC when exhaust gas was treated, using a honeycomb structure-type catalyst relevant to the present invention and a comparative catalyst.

In Comparative Examples of FIG. 13, there are those somewhat superior to Examples of the present invention, however, purification capability of a catalyst in the hot start is generally high, also, purification performance of exhaust gas should be evaluated by performance in general use states from low temperature to high temperature. Therefore, value in the hot start and value in the cold start are totaled to show comprehensive exhaustion amount of $NO_x$ in FIG. 14, and comprehensive exhaustion amount of THC in FIG. 15. According to FIG. 14 and FIG. 15, it is understood that Example 1 exerts superior purification performance as compared with Comparative Examples 1 to 5. The reason for such superiority in purification performance of Example 1 to each Comparative Example is considered as follows.

In the upper layer of the upstream catalyst, the Rh component loaded on a support material $ZrO_2$ substantially not containing the cerium component, and having zirconium oxide as a main component is maintained in a metal state. $Rh/[ZrO_2]$ is superior in performance of the steam reforming reaction from a stoichiometric region to a rich region, while relatively inferior against variation of A/F (air/fuel ratio). Decrease in purification performance of $NO_x$ caused by this variation of A/F is compensated by the cerium-containing oxide.

On the other hand, in the upper layer of the downstream catalyst, by widening of the window region where purification action of $NO_x$ is exerted, by adsorption of $NO_x$ by $CeO_2.ZrO_2$ (A), and buffering of A/F variation, purification performance of $NO_x$ is exerted.

In addition, the cerium-containing oxide, $CeO_2.ZrO_2$ (A), in each of such upper layer catalyst, supplies oxygen to the lower layer to contribute to promotion of purification performance of HC or CO. In addition, storage performance of NO is exerted and exhaustion of NO in a lean state is suppressed by the Ba component contained in the lower layer.

Further, as in Example 1, by using the Pt component in the lower layer of the downstream catalyst, the water gas shift reaction is promoted and purification of $NO_x$ is promoted further.

However, as in Comparative Example 1, when Rh is loaded on $CeO_2.ZrO_2$ (A), in the upper layer of the upstream catalyst, purification performance of NO results in decreasing. In addition, by $CeO_2.ZrO_2$ (A), variation of oxygen concentration in exhaust gas caused by A/F variation is absorbed, however, because of decrease in performance of the steam reforming reaction, purification performance of NO is also decreased.

In Comparative Example 2, because the Rh layer of the downstream catalyst is configured by the Rh component loaded on an oxide support material substantially not containing the cerium component, and having zirconium oxide as a main component, A/F variation cannot be absorbed, resulting in decrease in purification performance of $NO_x$. This significantly appears in particular, in the hot start, where concentration of NO becomes high.

In the TWC containing the Rh component and the Pd component, by co-presence of the Ba component and the Pd component, purification performance of $NO_x$ is said enhanced (Applied Catalysis B: Environmental, 30, (2001), 287-292). It is considered that this is due to influence of interaction between the Ba component and the Pd component, as well as a storing action of $NO_x$ by the Ba component.

In Comparative Examples 3 and 4, it is considered that purification performance of $NO_x$ results in decreasing, because an action by the Ba component, along with interaction between the Ba component and the Pd component become not to be exerted, due to absence of the Ba component in the layer containing Pd.

In Comparative Example 5, it is considered that because catalyst arrangement was exchanged for the upstream side and the downstream side of Example 1, similarly as in Comparative Example 2, it results in that the Rh layer of the downstream catalyst substantially does not contain the cerium component, and is configured by the Rh component loaded on an oxide support material having zirconium oxide as a main component, and also because of absence of Pt in the downstream side, progress of the water gas shift reaction of the downstream catalyst becomes difficult, purification performance of $NO_x$ results in decreasing.

INDUSTRIAL APPLICABILITY

The apparatus of a catalyst for purifying exhaust gas of the present invention can be used for purification of carbon monoxide (CO), a hydrocarbon (HC), and a nitrogen oxide ($NO_x$) in exhaust gas exhausted from an internal combustion engine of a gasoline automobile, a diesel automobile or the like.

What is claimed is:

1. An apparatus of a catalyst for purifying exhaust gas for purifying a hydrocarbon (HC), carbon monoxide (CO) and a nitrogen oxide ($NO_x$), by providing two or more honeycomb structure-type catalysts, wherein the surface of a honeycomb-type structure is coated with two or more layers of catalyst compositions, in a flow passage of exhaust gas exhausted from an internal combustion engine, and making exhaust gas pass, characterized in that:

the honeycomb structure-type catalyst (X) positioned at the upstream side and the honeycomb structure-type catalyst (Y) positioned at the downstream side contain the catalyst composition composed of a support material of an inorganic oxide which substantially does not contain an Rh component, and loaded at least one of a Pt component or a Pd component, and a cerium-containing oxide and an alkaline earth metal component, in all of the lower layers; on the other hand, the catalyst composition of the upper layer has the following configuration:

<The honeycomb structure-type catalyst (X)>

The catalyst (X) contains the support material of the zirconium oxide as a main component which load a Rh component on the support material of zirconium oxide and substantially does not contain a cerium component, and a cerium-containing oxide which substantially does not load the Rh component, and the catalyst (X) does not substantially contain Pt component and Pd component <The honeycomb structure-type catalyst (Y)>

The catalyst (Y) contains the support material of the cerium-zirconium composite oxide as a main component which load a Rh component on the support material of cerium-zirconium composite oxide and which contains cerium of 1 to 20% by weight, in an oxide equivalent, and zirconium of 99 to 80% by weight, in an oxide equivalent, and the catalyst (Y) does not substantially contain Pt component and Pd component.

2. The apparatus of a catalyst for purifying exhaust gas according to claim 1, characterized in that the support material of the inorganic oxide contained in the lower layer of the honeycomb structure-type catalyst (X) and the honeycomb structure-type catalyst (Y) is alumina.

3. The apparatus of a catalyst for purifying exhaust gas according to claim 1, characterized in that the alkaline earth metal component contained in the lower layer of the honeycomb structure-type catalyst (X) and the honeycomb structure-type catalyst (Y) is a barium component.

4. The apparatus of a catalyst for purifying exhaust gas according to claim 1, characterized in that the cerium-containing oxide contained in the lower layer of the honeycomb structure-type catalyst (X) and the honeycomb structure-type catalyst (Y) is the cerium-zirconium composite oxide.

5. The apparatus of a catalyst for purifying exhaust gas according to claim 1, characterized in that amounts of the lower layer catalyst components of the honeycomb structure-type catalyst (X) and the honeycomb structure-type catalyst (Y) are as follows, per unit volume:

the Pt component and/or the Pd component are 0.01 to 10 g/L the inorganic oxide loading the Pt component and the Pd component is 1 to 300 g/L the cerium-containing oxide is 3 to 200 g/L the alkaline earth metal component is 1 to 30 g/L.

6. The apparatus of a catalyst for purifying exhaust gas according to claim 1, characterized in that amounts of the upper layer catalyst components of the honeycomb structure-type catalyst (X) are as follows, per unit volume:

the Rh component is 0.01 to 2 g/L the zirconium oxide loading the Rh component is 1 to 300 g/L the cerium-containing oxide not loading the Rh component is 3 to 200 g/L.

7. The apparatus of a catalyst for purifying exhaust gas according to claim 1, characterized in that amounts of the upper layer catalyst components of the honeycomb structure-type catalyst (Y) are as follows, per unit volume:

the Rh component is 0.01 to 2 g/L the cerium-zirconium composite oxide loading the Rh component is 1 to 300 g/L.

8. The apparatus of a catalyst for purifying exhaust gas according to claim 1, characterized in that the honeycomb-type structure is a flow-through-type honeycomb-type structure having a cell density of 10 to 1500 cell/inch$^2$.

9. A purification method for exhaust gas, characterized in that a hydrocarbon (HC), carbon monoxide (CO) and a nitrogen oxide ($NO_x$) are purified by supplying exhaust gas from an internal combustion engine to the apparatus of a catalyst for purifying exhaust gas according to any one of claims 1 to 8, and by making it sequentially contacted with the honeycomb structure-type catalyst (X) at the upstream side of the exhaust gas flow passage and the honeycomb structure-type catalyst (Y) at the downstream side of the exhaust gas flow passage.

10. The purification method for exhaust gas according to claim 9, characterized in that the internal combustion engine is a gasoline engine, and gasoline fuel is combusted under lean-rich control by sandwiching theoretical air/fuel ratio.

* * * * *